United States Patent

Yamaguchi et al.

[11] Patent Number: 5,106,913
[45] Date of Patent: Apr. 21, 1992

[54] RUBBER COMPOSITION

[75] Inventors: Tetsuo Yamaguchi, Hirakata; Shin-ichi Yachigo, Toyonaka; Tamaki Ishii, Suita; Masakatsu Yoshimura, Sakai; Chinehito Ebina, Minoo; Eizo Okino, Kurashiki, all of Japan

[73] Assignee: Sumitomo Chemical Company, Limited, Osaka, Japan

[21] Appl. No.: 496,048

[22] Filed: Mar. 16, 1990

Related U.S. Application Data

[63] Continuation of Ser. No. 294,996, Jan. 9, 1989, abandoned, which is a continuation of Ser. No. 71,911, Jul. 10, 1987, abandoned.

[30] Foreign Application Priority Data

Jul. 16, 1986 [JP] Japan .................. 61-167515
Feb. 19, 1987 [JP] Japan .................. 62-37590
Feb. 27, 1987 [JP] Japan .................. 62-45964

[51] Int. Cl.$^5$ .............................. C08C 19/22
[52] U.S. Cl. .............................. 525/332.7; 524/495; 525/377
[58] Field of Search .............. 525/332.7, 377, 382

[56] References Cited

U.S. PATENT DOCUMENTS

3,151,161 9/1964 Mullins .................. 525/377
3,367,904 2/1968 Mullins et al.
3,756,969 9/1973 Danielson .............. 525/377

FOREIGN PATENT DOCUMENTS

47-3897 2/1972 Japan .
50-38131 12/1975 Japan .
58-118837 7/1983 Japan .
59-18740 1/1984 Japan .

OTHER PUBLICATIONS

Rubber World, 135, 413–420, 428 (1956).
Rubb. Chem. and Technol., 49, 1019–1030 (1976).
J. Am. Chem. Soc., 68, 10–12 (1946).
J. Am. Chem. Soc., 68, 12–14 (1946).
J. Am. Chem. Soc., 68, 14–18 (1946).
J. Am. Chem. Soc., 78, 482–484 (1956).
J. Am. Chem. Soc., 78, 484–486 (1956).
J. Chem. Soc., 1766–1767 (1949).
J. Org. Chem., 23, 1115–1117 (1958).
Chem. Pharm. Bull., 12, 946–950 (1964).
Aust. J. Chem., 21, 2797–2800 (1968).

*Primary Examiner*—Christopher Henderson
*Attorney, Agent, or Firm*—Stevens, Davis, Miller & Mosher

[57] ABSTRACT

Dynamic properties of vulcanized rubber are improved, without accelerating scorching property remarkably nor deteriorating flex-cracking resistance, by incorporating in a filler-containing natural or synthetic rubber composition, a dinitrodiamine derivative represented by the general formula

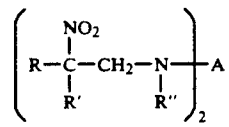

wherein A represents a divalent aliphatic group, a divalent cycloaliphatic group, a divalent aromatic group or a group represented by the formula —CH$_2$—X—CH$_2$—, wherein X represents a cycloalkylene group or a phenylene group, provided that if A represents a cycloaliphatic group or an aromatic group, the two carbon atoms in A which are bonding to the nitrogen atom are not vicinal to each other; R and R' independently represent hydrogen atom or an alkyl group having 1–12 carbon atoms and may conjointly form a ring; and R" represents hydrogen atom, an aliphatic group, a cycloaliphatic group or an aromatic group. A process for producing the dinitrodiamine derivatives is also disclosed.

8 Claims, No Drawings

RUBBER COMPOSITION

This application is a continuation of application Ser. No. 07/294,996, filed Jan. 9, 1989, now abandoned, which in turn is a continuation of application Ser. No. 07/071,911, filed Jul. 10, 1987, now abandoned.

BACKGROUND OF THE INVENTION

The present invention relates to a rubber composition containing a dinitrodiamine compound for improving dynamic properties of the vulcanized rubber containing filler.

Recently, there have been caused urgent social requirements for improving rubber tires with regard to rate of fuel consumption of passenger cars and for extending running life of large size tires in motor trucks and buses. Thus, the improvement in dynamic properties such as resilience and exothermic properties of vulcanized rubber used widely for tires and other rubber products has become important to meet the requirements.

As methods for improving the dynamic properties, such methods as improvements in, for example, microstructure or molecular weight distribution of rubber, improvements in compounding manner of rubber chemicals or fillers, addition of dynamic property improvers and the like are well known in the art.

Among these methods, the method of adding dynamic property improvers has been paid attention since the method can improve the dynamic properties more easily in comparison with the other methods and can be applied also to natural rubber for the improvement. There have been developed as the dynamic property improvers, for example, 8-oxyquinoline derivatives having a specific structure as disclosed in Unexamined Published Japanese Patent Application No. 118837/83 and nitro compounds containing sulfur atoms disclosed in Unexamined Published Japanese Patent Application No. 18740/84.

However, both the 8-oxyquinoline derivatives and the sulfur-containing nitro compounds were, in spite of their excellent effects on improvements in resilience and exothermic property, not entirely satisfactory due to their undesirable effects of accelerating the scorching property remarkably or deteriorating the flex-cracking resistance.

On the other hand, dinitrodiamines are known to be useful as a metal additive, an additive for oils or an intermediate thereof, which include, for example, N,N'-bis(2-methyl-2-nitropropyl)piperazine [J. Am. Chem. Soc., 78, 482 (1956)]; N,N'-bis[(1-nitrocyclohexyl)methyl]-1,2-diaminoethane and N,N'-bis[(1-nitrocyclohexyl)methyl]-1,6-diaminohexane [J. Org. Chem., 23, 1115 (1958)]; N,N'-bis(2-methyl-2-nitroethyl)-1,2-diaminoethane [Aust. J. Chem., 21, 2797 (1968)] and the like. They are also known to be used, for example, as a metal chelating agent to be added after reducing nitro groups into amino groups. However, nothing has been reported about these dinitrodiamines that they are useful as additives for improving the dynamic properties such as resilience and exothermic property of vulcanized rubber.

As methods for producing these dinitrodiamines, there are disclosed respectively in J. Am. Chem. Soc., 78, 482 (1956) a method for producing N,N'-bis(2-methyl -2-nitropropyl)piperazine by reacting piperazine, 2-nitropropane and formaldehyde at temperatures up to a steam bath temperature, and in J. Org. Chem., 23, 1115 (1958) a method for producing N,N'-bis[(1-nitrocyclohexyl)methyl]-1,2-diaminoethane by reacting 1,2-diaminoethane, nitrocyclohexane and formaldehyde at a temperature of 60° C. or below.

The former method uses, in principle, a secondary diamine as a raw material, but when a primary diamine is used as the raw material to carry out in accordance with the method, yield of the aimed dinitrodiamine compound is appreciably decreased due to formation of a variety of by-products.

The latter method is a reaction at a low temperature in which formaldehyde is used in an excessive amount than the amounts of the primary diamine and the nitroalkane, however, it produces thermally unstable by-products such as trinitrodiamines, tetranitrodiamines or the like and various kinds of by-products having unidentified structure. Accordingly, the method is not entirely satisfactory because of the low yield of the aimed dinitrodiamine compound.

SUMMARY OF THE INVENTION

An object of the present invention is to improve the dynamic properties of vulcanized rubber by compounding a dinitrodiamino compound. Particularly, the object of the present invention is to provide a rubber composition having improved dynamic properties without accelerating the scorching property remarkably nor deteriorating the flex-cracking resistance.

Another object of the present invention is to provide a novel compound useful for such rubber composition.

Further object of the present invention is to provide a process for producing a dinitrodiamine derivative useful for such rubber composition, and also useful as a metal extracting agent, an additive for oils or an intermediate thereof.

The present invention provides a rubber composition which comprises incorporating in a filler-containing natural rubber or synthetic rubber a dinitrodiamine derivative represented by the general formula

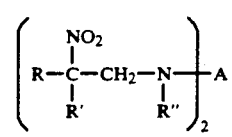

(I)

wherein A represents a divalent aliphatic group, a divalent cycloaliphatic group, a divalent aromatic group or a group represented by the formula —CH$_2$—X—CH$_2$—, wherein X represents a cycloalkylene group or a phenylene group, provided that if A represents a cycloaliphatic group or an aromatic group, the two carbon atoms in A bonding to the nitrogen atoms are not vicinal to each other; R and R' independently represent hydrogen atom or an alkyl group having 1–12 carbon atoms and may conjointly form a ring; and R" represents hydrogen atom, an aliphatic group, a cycloaliphatic group or an aromatic group.

Among the compounds represented by the aforementioned formula (I), those in which the connecting group A is an alkylene group having 4 or more carbon atoms, R" is hydrogen atom and no ring is formed by R and R', that is, dinitrodiamine derivatives represented by the general formula

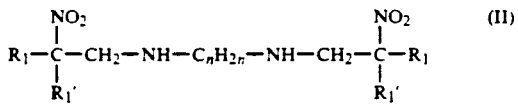

wherein $R_1$ and $R_1'$ independently represent hydrogen atom or an alkyl group having 1–12 carbon atoms and do not bond to each other; and n represents an integer of 4–18; are novel compounds.

Furthermore, the present invention provides a process for producing a dinitrodiamine derivative represented by the general formula

wherein A' represents a divalent aliphatic group, a divalent cycloaliphatic group, a divalent aromatic group or a group represented by the formula —CH$_2$—X—CH$_2$— wherein X represents a cycloalkylene group or a phenylene group, and R and R' are as defined previously.

DETAILED DESCRIPTION OF THE INVENTION

The following compounds are typical examples of the dinitrodiamine derivatives represented by the general formula (I) being preferably used for the rubber composition of the present invention, in which —Z represents the undermentioned formula

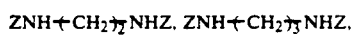

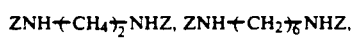

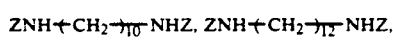

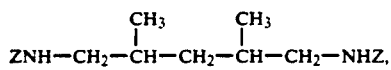

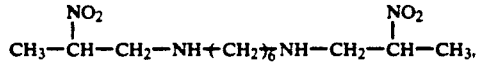

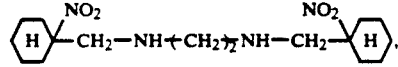

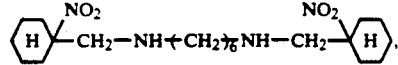

-continued

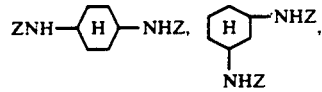

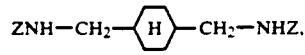

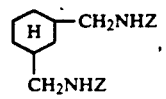

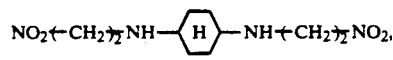

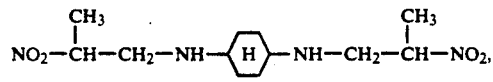

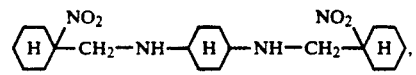

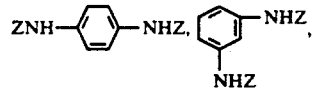

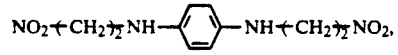

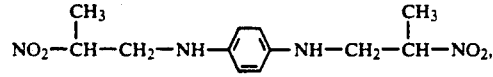

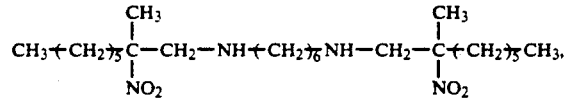

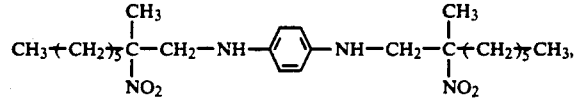

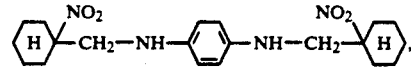

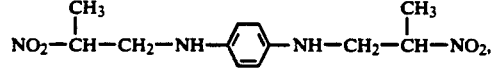

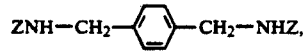

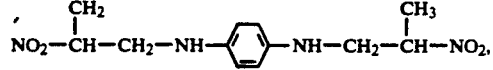

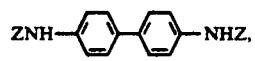

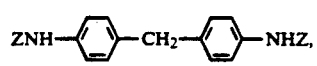

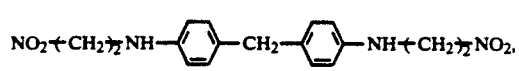

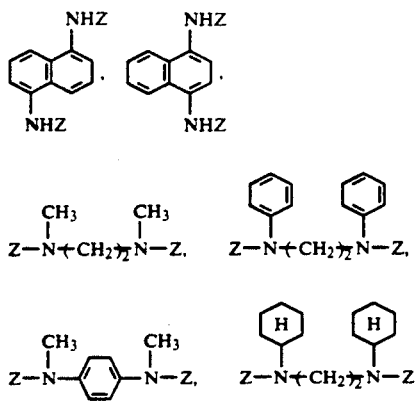

In the above general formula (I), when the connecting group A is a cycloaliphatic group or an aromatic group having two vicinal carbon atoms bonding respectively to nitrogen atoms, for example, when two nitrogen atoms are bonding to carbon atoms at the ortho position in the group A, such compounds exhibit little improving effect of the dynamic properties and are not suitable for a component of the objective rubber composition of the present invention.

At least one of the groups R and R' in the aforementioned formula (I) is preferably an alkyl group having 6 or less carbon atoms and, more preferably, both R and R' are respectively the above alkyl groups.

The group R" in the aforementioned formula (I) is preferably hydrogen atom or an aliphatic group, amongst which hydrogen atom or an alkyl group having 1-6 carbon atoms are most preferred.

The amount of the dinitrodiamine derivative represented by the general formula (I) is not critical for compounding rubber compositions. However, if the dinitrodiamine derivative is used in an extremely small amount, it exhibits only unsatisfactory improving effect on the dynamic properties. If it is employed too much in amount, the effect is saturated to an uneconomical level. Therefore, it is usually employed in a proportion of 0.1-10 parts by weight to 100 parts by weight of rubber.

Typical examples of filler used in the present invention are carbon black, silica, talc, clay and the like, which have hitherto been used in the art of rubber industry. Among these fillers, carbon black is particularly preferable. Such fillers are used in the same blending ratios as those used conventionally and are not specified in the present invention.

Rubbers which can be used in the present invention include natural rubbers and various kinds of synthetic rubbers such as polyisoprene rubber (IR), styrene-butadiene copolymer rubber (SBR), polybutadiene rubber (BR), acrylonitrile-butadiene copolymer rubber (NBR), isoprene-isobutylene copolymer rubber (IIR), ethylene-propylene-diene copolymer rubber (EPDM) and the like, in which preferably used are rubbers having high degree of unsaturation.

In general, when compounding ingredients are compounded in natural rubber or synthetic rubber, they are compounded, in principle, by two steps. That is, fillers, processing oil, stearic acid or the like are compounded in the first step at a relatively high rubber temperature of about 120°-170° C., and a vulcanization accelerator and a vulcanizing agent are compounded in the second step at a relatively low rubber temperature of about 30°-120° C.

In the preparation of rubber composition of the present invention, the dinitrodiamine derivative can be compounded in an optional manner into rubber as, for example, may be compounded together with a vulcanization accelerator and a vulcanizing agent in the second step, but is preferably compounded in the first step when fillers and the like are compounded. The higher the compounding temperature is, the more effectively the dynamic properties of the vulcanized rubber is improved. However, the compounding temperature of 200° C. or lower is usually employed, since deterioration by oxidation of rubber occurs on compounding at an excessively high temperature. During the process of compounding the dinitrodiamine derivative with rubber, a vulcanization accelerator and a vulcanizing agent such as dimorpholino disulfide or the like may be compounded as auxiliary agents in a small amount in order to improve further the effect. When the dinitrodiamine derivative and fillers such as carbon black are compounded, torque of the rubber tends to increase. In order to remedy this phenomenon, a peptizer or a retarder may also be compounded. Further, a variety of rubber chemicals, a softener and the like may also be compounded with the rubber, if necessary.

Thus, according to the rubber composition of the present invention, dynamic properties such as resilience and resistance to heat build-up in vulcanizates of natural rubber, various kinds of synthetic rubbers and the like are improved. In the same time, flex-crack resistance which had been deterioratively affected along with the improvement in the aforementioned dynamic properties in the conventional techniques is also improved, and scorching property is extensively improved as compared with that of the conventional product. Because of these features of the rubber composition according to the present invention, it may be applied not only to treads of various sorts of tires but also to the other parts of tires. It may be further employed effectively for industrial products such as antivibration rubbers and the like.

The dinitrodiamine derivative represented by the general formula (II) is a novel compound and is very useful not only as a metal extracting agent, an oil additive or an intermediate thereof but also as a newly found improving agent for dynamic properties of rubbers such as resilience and resistance to heat build-up of natural rubber and synthetic rubbers.

The process for producing the dinitrodiamine derivative represented by the general formula (I) will be explained hereunder. In the above general formula (I), when the connecting group A is cycloaliphatic group or an aromatic group having two vicinal carbon atoms connected respectively to nitrogen atoms, such compounds are excluded from the ingredient to be compounded with rubbers from the viewpoint of the compounded rubber properties. However, it is needless to say that the excluded compound can also be produced by the same method as described below.

Such dinitrodiamine derivatives may be produced in accordance with well-known methods. Thus, a dinitrodiamine derivative represented by the general formula

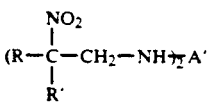 (III)

wherein A' represents a divalent aliphatic group, a divalent cycloaliphatic group, a divalent aromatic group or a group —CH$_2$—X—CH$_2$— wherein X represents a cycloalkylene group or a phenylene group, and R and R' are as defined previously, can be produced by a reaction of a primary diamine represented by the general formula

 (IV)

wherein A' is as defined above, with a nitroalkane represented by the general formula

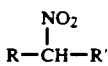 (V)

wherein R and R' are as defined previously, and formaldehyde. Furthermore, the hydrogen atom at the secondary amino group in the compound represented by the general formula (III) can be substituted with an aliphatic group, a cycloaliphatic group or an aromatic group by a usual method to give a compound represented by the general formula

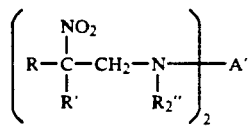 (VI)

wherein A', R and R' are as defined above, and R$_2$'' represents an aliphatic group, a cycloaliphatic group or an aromatic group.

However, in order to produce the dinitrodiamine derivatives represented by the general formula (III) in a high yield and easily in an industrial scale, the present inventors have found that factors such as the ratios of respective raw materials used and reaction temperatures are critical and the above object can be achieved only under particular conditions within the specified ranges. Further, it has also been found that the ratios of respective raw materials used have serious effects on the composition of products other than the main product.

That is, in order to achieve the above object, it is necessary to carry out the reaction of the primary diamine represented by the general formula (IV), the nitroalkane represented by the general formula (V) and formaldehyde under the condition that amounts of the nitroalkane and the formaldehyde are 1.8 moles or more and 1.8–2.2 moles, respectively, per 1 mole of the primary diamine, and at a temperature of 80° C. or lower.

The primary diamine used in this reaction refers to an aliphatic diamine, a cycloaliphatic diamine or an aromatic diamine. The aliphatic diamine includes, for example, 1,2-diaminoethane, 1,4-diaminobutane, 1,6-diaminohexane, 1,8-diaminooctane, 1,10-diaminodecane, 1,12-diaminododecane, 1,18-diaminooctadecane, 1,5-diamino-2,4-dimethylpentane and the like. The cycloaliphatic diamine includes, for example, 1,4-diaminocyclohexane, 1,3-diaminocyclohexane, 1,4-bis(aminomethyl)cyclohexane and the like. The aromatic diamine includes, for example, p-phenylene diamine, m-phenylene diamine, 1,4-bis(amino methyl)benzene, 4,4'-diaminodiphenylmethane, 4,4'-diaminodiphenyl ether and the like.

As the nitroalkanes, there are mentioned, for example, nitromethane, nitroethane, 1-nitropropane, 2-nitropropane, 2-nitrobutane, 2-nitrooctane, 2-nitrododecane, nitrocyclohexane and the like.

As the formaldehyde, although an aqueous formaldehyde solution is usually used, paraformaldehyde may also be used. When an aqueous formaldehyde solution is used, the concentration of the solution has no important effect on the reaction, but formalin having formaldehyde content of about 37% by weight is usually used.

The ratios of respective raw materials used in this reaction are very important as they are factors effecting largely on the reaction results, and it is necessary to use the nitroalkane and the formaldehyde, respectively, in a proportion of 1.8 moles or more and 1.8–2.2 moles per 1 mole of the primary diamine.

When the nitroalkane is used in a proportion of less than 1.8 moles per 1 mole of the primary diamine, the raw material primary diamine and the intermediate mononitrodiamine remain unreacted in the system to decrease the yield and require complicated operations for separation of the aimed product. The nitroalkane is used preferably in a proportion of 2 moles or more per 1 mole of the primary diamine. The upper limit of the amount of the nitroalkane used is not critical but usually is in a proportion of 3 moles per 1 mole of the primary diamine in consideration of the volumetric efficiency.

The formaldehyde is usually used in a proportion of 1.8–2.2 moles, preferably 2.0–2.2 moles per 1 mole of the primary diamine. The ratio of the formaldehyde used to the primary diamine has a serious effect on the composition of ingredients other than the main product. That is, when the formaldehyde is used in a proportion of 2.0–2.2 moles per 1 mole of the primary diamine, the ingredients other than the aimed product will be trinitrodiamines and tetranitrodiamines. But when the formaldehyde is used in a proportion of 1.8–2.0 moles per 1 mole of the primary diamine, the unreacted nitroalkane will be the main ingredient other than the aimed product. When the formaldehyde is used in an amount exceeding 2.2 moles per 1 mole of the primary diamine, thermally unstable trinitrodiamines and tetranitrodiamines are produced appreciably and the yield is decreased extensively. If it is used in an amount of less than 1.8 moles per 1 mole of the primary diamine, the raw materials primary diamine and the nitroalkane and the intermediate mononitrodiamine remain unreacted in the system to decrease the yield.

When this reaction process is carried out, there are used as the reaction techniques the optional processes such as (1) adding in combination of the nitroalkane and the aqueous formaldehyde solution to the primary diamine, (2) adding the formaldehyde to the mixture of the primary diamine and the nitroalkane, (3) adding the primary diamine to the mixture of the nitroalkane and the formaldehyde, (4) adding in combination of the primary diamine, the nitroalkane and the formaldehyde to the reaction system, and the like.

The charging sequence of respective raw materials has no important effect on the reaction.

In any of these processes, the reaction is preferably carried out in a state that the nitroalkane exists in an amount of 1 mole or more to 1 mole of the formaldehyde in the reaction system for high yield of the aimed product, and thus the feed and the feed rate are controlled to ensure that the aforementioned state is maintained. On the other hand, excess nitroalkane will remain in final product as an impurity. Therefore, when such remains of nitroalkane are not desired, the formaldehyde may be used in excess to the nitroalkanes. The excessive nitroalkane may serve as a solvent in this reaction, but lower alcohols such as methanol, ethanol, isopropyl alcohol or the like may also be used as a solvent.

Although this reaction is exothermic, it is important to carry out the reaction at a temperature of 80° C. or lower, and the reaction system is cooled or the feeding rates of the raw materials are controlled, if necessary. The reaction is preferably carried out at a temperature of 0°-60° C. If the reaction temperature exceeds 80° C., the product will be deterioratively decomposed. Based on the same reason as above, it is preferred to maintain the temperature of not only the reaction system but also entire production processes including purification process and the like at 80° C. or lower.

The reaction time varies depending on the raw materials, reaction temperature and the like, and is not limited to a specific range, but it is usually completed within 10 hours. In order to proceed smoothly the reaction, a small amount of an alkali or a phase transfer catalyst may be added to the reaction system.

After reaction, if the aimed product is crystallized, the reaction mixture may be filtered and the crystal thus obtained are washed with water and lower alcohol to obtain the aimed product. If the aimed product will not be crystallized, the reaction mixture is mixed with water and an extracting solvent of, for example, a hydrocarbon such as benzene, toluene, xylene or the like to conduct extraction and the solvent is removed by evaporation to obtain the aimed product. If the purification is necessary, the extract is treated in various manners such as in situ recrystallization, removing the extracting solvent from the extract by distillation or other methods and crystallizing out the crystal by the addition of an alcohol, an ester, an aliphatic hydrocarbon or the like.

According to the process of the present invention, the aimed dinitrodiamine represented by the general formula (III) can be produced in a high yield and easily in an industrial scale. Further, if the purification operation is not carried out, it is also possible to make freely quality designs depending on the purposes of application by changing the ingredients other than the aimed product in the reaction mixture.

This invention will be explained more specifically below with reference to Examples without restriction thereto.

EXAMPLES

Example 1

Production of N,N'-bis(2-methyl-2-nitropropyl)-1,4-diaminobenzene

In a 1 liter four-necked flask equipped with a stirrer, a thermometer and a condenser was charged 156.8 g (1.76 moles) of 2-nitropropane, to which 200 ml of methanol as a solvent and 16.7 g (0.04 mole) of 40% by weight trimethylbenzylammonium hydroxide solution in methanol as a catalyst were added.

The mixture was heated to and maintained at a temperature of 50° C., and then 136.3 g (1.68 moles) of 37% by weight aqueous formalin solution was added dropwise to the mixture over a period of about 1 hour.

Then, the temperature of the reaction mass was raised up to 60° C., and a p-phenylene diamine-methanol solution obtained by dissolving 86.5 g (0.6 mole) of p-phenylene diamine in 500 ml of methanol at 40° C. was added dropwise to the mass over a period of about 1 hour.

After completion of reaction and upon maintaining the reaction mass at a temperature of 60° C. for about 4 hours, crystals were deposited and the reaction mass became in a state of slurry.

The reaction mass was gradually cooled to a temperature of 5° C. and then filtered to collect the crystals. The crystals were washed with methanol and water and dried under reduced pressure at a temperature of 50° C. or lower to give 226.3 g of N,N'-bis(2-methyl-2-nitropropyl)-1,4-diaminobenzene (yield of 90.1% based on p-phenylene diamine).

The compound was pale yellow crystals having a melting point of 135°-137° C. The result of the elemental analysis of this compound was as follows:
Found: C, 54.13%; H, 7.22%; N, 18.09%.
Calculated: C, 54.18%; H, 7.14%; N, 18.05%.

It was confirmed by the FD-MS, $^1$H NMR and IR spectra that this compound has a structure represented by the formula

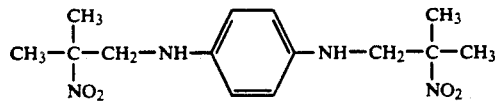

Example 2

Production of N,N'-bis(2-methyl-2-nitropropyl)-1,6-diaminohexane

In a 1 liter four-necked flask were charged 116.2 g (1.0 mole) of 1,6-diaminohexane, 178.2 g (2.0 moles) of 2-nitropropane and 140 g of methanol, to which 162.3 g (2.0 moles) of 37% by weight aqueous formalin was added dropwise at 45°-55° C. over a period of 1 hour.

After dropwise addition of the formalin, the mixture was maintained at the same temperature for 1 hour. Then, 200 ml of water was added to the mixture to separate the organic layer.

The organic layer was washed with 200 ml of water and concentrated under 30 Torr at 60° C. to give 304 g of a pale yellow liquid.

High performance liquid chromatography showed that the mixture contained 298 g of N,N'-bis(2-methyl-2-nitropropyl)-1,6-diaminohexane and 5 g of 2-nitropropane.

A 300 ml portion of hexane and 150 ml of toluene were added to the mixture and the resulting mixture was cooled to a temperature of 5° C. to give a slurry of crystals. The mixture was filtered and the crystals obtained were washed with 100 ml of cold hexane and dried at a temperature of 20° C. or lower to give 288 g of N,N'-bis(2-methyl-2-nitropropyl)-1,6-diaminohexane. This compound was pale yellow crystals having a melting point of 26°-27° C.

Elemental Analysis for $C_{14}H_{30}N_4O_4$:
Found: C, 52.69%; H, 9.45%; N, 17.57%.
Calculated: C, 52.81%; H, 9.50%; N, 17.60%.

Example 3

Production of N,N'-bis(2-methyl-2-nitropropyl)-1,6-diaminohexane

In a 1 liter four-necked flask were charged 116.2 g (1.0 mole) of 1,6-diaminohexane, 178.2 g (2.0 moles) of 2-nitropropane and 140 g of methanol, to which 178.6 g (2.2 moles) of 37% by weight aqueous formalin was added dropwise at 45°–55° C. over a period of 1 hour.

After dropwise addition of the formalin, the mixture was maintained at the same temperature for 1 hour. Then, 200 ml of water was added to the mixture to separate the organic layer.

The organic layer was washed with 200 ml of water and concentrated under 30 Torr at 60° C. to give 302 g of a pale yellow liquid.

High performance liquid chromatography showed that the mixture contained 272 g of N,N'-bis(2-methyl-2-nitropropyl)-1,6-diaminohexane but did not contain 2-nitropropane.

Examples 4–6

Production of other aliphatic dinitrodiamines.

Reaction and treatment was repeated in the same manner as in Example 2 except that primary diamines illustrated in Table 1 were used in place of 1,6-diaminohexane in an equimolar amount therewith, and the results listed in Table 1 were obtained.

of 40% by weight trimethylbenzylammonium hydroxide-methanol solution. To the mixture, 100 ml of a methanol solution containing 21.4 g (0.24 mole) of 2-nitropropane and 16.2 g (0.2 mole) of 37% by weight aqueous formalin were charged together at the constant charging rate of 1.67 ml/min. and 0.27 g/min., respectively, over a period of 1 hour.

Then, the mixture was maintained at a temperature of 50° C. for 5 hours.

After completion of reaction, the reaction mixture was charged into a 1 liter separatory funnel, to which 300 ml of toluene was added The toluene solution was washed with 100 ml of 1% by weight aqueous sulfuric acid solution and then with 200 ml of water.

The toluene layer was concentrated by removing the solvent under conditions of 5 Torr at 60° C. to give 30 g of a pale brown liquid.

High performance liquid chromatography analysis showed that N,N'-bis(2-methyl-2-nitropropyl)-1,3-diaminocyclohexane was contained in an amount of 29 g.

Elemental analysis for $C_{14}H_{28}N_4O_4$:
Found: C, 52.76%; H, 8.82%; N, 17.59%.
Calculated: C, 53.15%; H, 8.92%; N, 17.71%.

Examples 8–10

Production of other cycloaliphatic or aromatic dinitrodiamines

TABLE 1

| Example | Primary diamine raw material | Dinitrodiamine obtained | | | |
|---|---|---|---|---|---|
| | | Compound | Yield[*1] | M.P. | Elemental Analysis (%) |
| 4 | 1,4-Diamino-butane | N,N'-Bis(2-methyl-2-nitropropyl)-1,4-diaminobutane | 284 g (97.8%) | 10° C. or lower | $C_{12}H_{26}N_4O_4$ requires: C, 49.64; H, 9.03; N, 19.80 Found: C, 49.24; H, 8.89; N, 18.88 |
| 5 | 1,10-Diamino-decane | N,N'-Bis(2-methyl-2-nitropropyl)1,10-diaminodecane | 356 g (98.4%) | 30–33° C. | $C_{18}H_{38}N_4O_4$ requires: C, 57.73; H, 10.23; N, 14.96 Found: C, 57.64; H, 10.11; N, 14.87 |
| 6 | 1,12-Diamino-dodecane | N,N'-Bis(2-methyl-2-nitropropyl)1,12-diamino-dodecane | 378 g (98.9%) | 35–36° C. | $C_{20}H_{42}N_4O_4$ requires: C, 59.67; H, 10.52; N, 13.92 Found: C, 59.50; H, 10.39; N, 13.79 |

[*1]Number in parentheses refers purity by weight.

Example 7

Production of N,N'-bis(2-methyl-2-nitropropyl)-1,3-diaminocyclohexane

In a 300 ml flask were charged 11.4 g (0.1 mole) of 1,3-diaminocyclohexane, 100 ml of methanol and 1 ml Reaction and treatment was repeated in the same manner as in Example 7 except that primary diamines illustrated in Table 2 were used in place of 1,3-diaminocyclohexane in an equimolar amount therewith, and the results listed in Table 2 were obtained.

TABLE 2

| Example | Primary diamine raw material | Dinitrodiamine obtained | | | |
|---|---|---|---|---|---|
| | | Compound | Yield[*1] | M.P. | Elemental Analysis (%) |
| 8 | 1,4-Diamino-cyclohexane | N,N'-Bis(2-methyl-2-nitropropyl)-1,4-diaminocyclohexane | 29 g (98.1%) | 129–132° C. | $C_{14}H_{28}N_4O_4$ requires: C, 53.15; H, 8.29; N, 17.71 Found: C, 52.99; H, 8.87; N, 17.36 |
| 9 | 1,4-Bis(aminomethyl)cyclohexane | N,N'-Bis(2-methyl-2-nitropropyl)-1,4-bis(aminomethyl)- | 33 g (98.8%) | 56–57° C. | $C_{16}H_{32}N_4O_4$ requires: C, 55.79; H, 9.36; N, 16.27 |

TABLE 2-continued

| Example | Primary diamine raw material | Dinitrodiamine obtained | | | |
|---|---|---|---|---|---|
| | | Compound | Yield*[1] | M.P. | Elemental Analysis (%) |
| | | cyclohexane | | | Found: C, 55.34; H, 9.22; N, 16.10 |
| 10 | 4,4-Diamino-diphenyl-methane | N,N'-Bis(2-methyl-2-nitropropyl)-4,4'-diamino-diphenylmethane | 36 g (97.6%) | 125–128° C. | $C_{21}H_{28}N_4O_4$ requires: C, 62.98; H, 7.05; N, 13.99 Found: C, 61.56; H, 6.95; N, 13.61 |

*[1] Number in parentheses refers purity by weight.

Example 11

Production of N,N'-dimethyl-N,N'-bis(2-methyl-2-nitropropyl)-1,4-diaminobenzene

In a 2 liter four-necked flask equipped with a stirrer, a thermometer and a condenser, was charged 31.0 g (0.1 mole) of N,N'-bis(2-methyl-2-nitropropyl)-1,4-diaminobenzene obtained in Example 1, to which 400 g of benzene and 120 g of N,N-dimethylformamide were added to give a solution. The solution was maintained at a temperature of 20°–25° C and 46.2 g (0.3 mole) of dimethyl sulfate was added dropwise over a period of 30 minutes.

The mixture was heated to 80° C. and maintained at the same temperature for 30 hours. After completion of keeping at the temperature, the reaction mass was cooled to a temperature of 50° C. and 200 g of 40% by weight aqueous ammonia and 1000 g of toluene were added and extraction was conducted.

After the organic layer was washed with 200 g of water, 100 g of active clay was added to the organic layer and stirred at 50° C. for 1 hour. The mixture was hot-filtered at 50° C., and the filtrate obtained was concentrated by evaporation under reduced pressure to give a reddish-brown solid.

To the solid was added 150 g of ethanol, and the mixture was heated at 50° C. to dissolve the solid completely. The solution was cooled to −5° C. to give crystals.

The mixture was filtered and the crystals were collected, washed with cold ethanol and dried under reduced pressure at 50° C. to give 25.0 g of N,N'-dimethyl-N,N'-bis(2-methyl-2-nitropropyl)-1,4-diaminobenzene (yield, 80.6%).

The compound was reddish-brown crystals having melting point of 119°–121° C.

Elemental analysis for $C_{16}H_{26}N_4O_4$:
Found: C, 56.83%; H, 7.69%; N, 16.52%.
Calculated: C, 56.79%; H, 7.74%; N, 16.56%.

Example 12

Compounding the dinitrodiamines with natural rubber and properties of the compounded rubber A variety of the dinitrodiamines listed in Table 3 produced by or in accordance with the above examples were compounded with natural rubber to conduct various tests. Further, for comparison, the same tests were conducted for the cases that 7-(dimethyldithiocarbamoylmethyl)-8-hydroxyquinoline (compound X) disclosed in Unexamined Published Japanese Patent Application No. 118837/83 was added and that no such compound was added as the additive.

TABLE 3

| Code No. of Compound | Nomenclature of compound | Production Example of Compound |
|---|---|---|
| A | N,N'-Bis(2-methyl-2-nitropropyl)-1,4-diaminobenzene | Example 1 |
| B | N,N'-Bis(2-nitropropyl)-1,3-diaminobenzene | — |
| C | N,N'-Bis(2-methyl-2-nitropropyl)-1,2-diaminoethane | — |
| D | N,N'-Bis(2-methyl-2-nitropropyl)-1,6-diaminohexane | Examples 2 and 3 |
| E | N,N'-Bis(2-methyl-2-nitropropyl)-1,12-diaminododecane | Example 6 |
| F | N,N'-Bis(2-methyl-2-nitropropyl)-1,18-diaminooctadecane | — |
| G | N,N'-Bis(2-nitropropyl)-1,6-diaminohexane. | — |
| H | N,N'-Bis(2-methyl-2-nitropropyl)-1,4-bis(aminomethyl)-cyclohexane | Example 9 |
| I | N,N'-Bis(2-methyl-2-nitropropyl)-4,4'-diaminodiphenyl-methane | Example 10 |
| J | N,N'-Bis(2-methyl-2-nitrooctyl)-1,6-diaminohexane | — |
| K | N,N'-Bis(2-methyl-2-nitrooctyl)-1,4-diaminobenzene | — |
| L | N,N'-Dimethyl-N,N'-bis(2-methyl-2-nitropropyl)-1,4-diaminobenzene | Example 11 |
| X | 7-(Dimethyldithiocarbamoylmethyl)-8-hydroxyquinoline | — |

Compounding design composition was as follows:

| | |
|---|---|
| Natural rubber (RSS #1) | 100 parts by weight |
| HAF Black | 45 |
| Stearic acid | 3 |
| Aromatic processing oil | 3 parts by weight |
| Zinc oxide | 5 |
| Vulcanization accelerator (N-Cyclohexyl-2-benzothiazol sulphenamide) | 1 |
| Sulfur | 2 |
| Compound as additive | listed in Table 4 |

A 250 ml LABOPLASTOMILL ®, manufactured by TOYO SEIKI CO., LTD., was used as a Bumbury's mixer. First of all, natural rubber was mixed with carbon black, zinc oxide, process oil, stearic acid and a compound such as the dinitrodiamine at the oil bath temperature of 170° C., and the mixture was kneaded for 5 minutes at 60 rpm. The temperature of the rubber was 150°–160° C.

Next, the blend was placed on an open mill, and the vulcanization accelerator and the sulfur listed in the above-mentioned design were added thereto at a temperature of 40°–50° C., and the mixture was kneaded.

The mixture was further treated with a vulcanizing press at 145° C. for 20 minutes into a predetermined form to be provided for various tests.

Various test methods are as follows:

(1) Mooney scorching property

Using a Fatigue-to-Failure Tester manufactured by Monsant Co., flex cycles until breaking were measured under the condition of 100% of strain.

The compounding condition and the test results are listed in Table 4.

TABLE 4

|  |  | Examples of the present invention | | | | | | | | | |
|---|---|---|---|---|---|---|---|---|---|---|---|
|  |  | 1 | 2 | 3 | 4 | 5 | 6 | 7 | 8 | 9 | 10 |
| Compounding condition | Compound as additive | A | A | B | B | C | D | D | E | E | F |
|  | Addition amount of the compound (parts by weight) | 1 | 2 | 1 | 2 | 1 | 1 | 2 | 1 | 2 | 1 |
| Physical properties of rubber | Scorching time (min) | 12.5 | 11.5 | 13.4 | 12.1 | 11.9 | 10.9 | 10.9 | 10.7 | 15.1 | 11.2 |
|  | Resilience (%) | 69 | 73 | 67 | 71 | 68 | 77 | 76 | 77 | 76 | 70 |
|  | Heat build-up temperature (°C.) | 34 | 30 | 38 | 33 | 35 | 29 | 27 | 28 | 26 | 31 |
|  | Flex-cracking resistance (KC) | 24.3 | 24.3 | 31.4 | 31.4 | 23.3 | 25.1 | 21.9 | 29.3 | 26.6 | 21.5 |
|  | $M_{300}$ (kg/cm$^2$) | 160 | 165 | 159 | 162 | 163 | 165 | 169 | 164 | 168 | 160 |

|  |  |  |  |  |  |  |  | Comparative Examples | |
|---|---|---|---|---|---|---|---|---|---|
|  |  | 11 | 12 | 13 | 14 | 15 | 16 | 17 | 18 | 19 |
| Compounding condition | Compound as additive | G | H | H | I | J | K | L | X | none |
|  | Addition amount of the compound (parts by weight) | 1 | 1 | 2 | 1 | 1 | 1 | 1 | 1 | none |
| Physical properties of rubber | Scorching time (min) | 10.5 | 10.1 | 13.1 | 13.5 | 11.0 | 13.3 | 15.0 | 2.5 | 16.7 |
|  | Resilience (%) | 69 | 74 | 77 | 70 | 70 | 68 | 70 | 69 | 62 |
|  | Heat build-up temperature (°C.) | 33 | 32 | 28 | 37 | 31 | 35 | 33 | 34 | 42 |
|  | Flex-cracking resistance (KC) | 20.9 | 21.5 | 27.1 | 21.5 | 23.2 | 26.2 | 29.6 | 10.9 | 21.1 |
|  | $M_{300}$ (kg/cm$^2$) | 156 | 166 | 170 | 160 | 161 | 159 | 160 | 172 | 149 |

In accordance with JIS-K-6300, scorching time was determined by measuring the time required for increasing 5 points from the lowest value at 125° C., except that SBR in Example 13 was tested at 135° C.

(2) Tensile property, resilience

In accordance with JIS-K-6301, measurement was conducted. Tensile stress (M300) was measured by the use of a No. 5 type ring. Resilience was measured by the use of a Lüpke type tester.

(3) Resistance to heat build-up

In accordance with ASTM-D-623-58, a GOODRICH type heat build-up tester was used for measurement of exotherm temperature after 40 minutes (represented by the difference between the initial rubber temperature and the rubber temperature after 40 minutes) with a load of 35 lbs., a stroke of 6.35 mm, a frequency of 1800 rpm and a chamber temperature of 40° C.

(4) Flex-cracking resistance

As apparent from Table 4, by incorporating into rubber any one of the compound A-L according to the present invention, resilience and heat build-up resistance are extensively improved compared with the case that no compound is added, and scorching property and flex-cracking resistance are also improved extensively as compared with the case of compound X according to the conventional technique.

Example 13

Compounding the dinitrodiamines with synthetic rubbers and properties of the compounded rubber Test pieces were made in the same manner as in Example 12 except that in place of natural rubber, SBR No. 1500 was used and the oil bath temperature was set at 190° C. Tests for evaluation were conducted in the same manner as above. The results are listed in Table 5.

From the results of the tests, it can be understood that the same effects are obtained also in SBR as in natural rubber.

TABLE 5

|  |  | Examples of the present invention | | | | | | | Comparative Examples | |
|---|---|---|---|---|---|---|---|---|---|---|
|  |  | 1 | 2 | 3 | 4 | 5 | 6 | 7 | 8 | 9 |
| Compounding | Compound as additive | A | D | D | D | J | K | L | X | none |

TABLE 5-continued

| | | Examples of the present invention | | | | | | | Comparative Examples | |
|---|---|---|---|---|---|---|---|---|---|---|
| | | 1 | 2 | 3 | 4 | 5 | 6 | 7 | 8 | 9 |
| condition | Addition amount of the compound (parts by weight) | 2 | 0.5 | 1 | 2 | 1 | 1 | 1 | 2 | none |
| Physical properties of rubber | Scorching time (min) | 16.1 | 21.0 | 20.3 | 18.8 | 21.6 | 20.5 | 21.5 | 7.4 | 22.4 |
| | Resilience (%) | 58 | 55 | 57 | 60 | 56 | 55 | 54 | 55 | 53 |
| | Heat build-up temperature (°C.) | 58 | 61 | 58 | 53 | 59 | 60 | 60 | 57 | 65 |
| | Flex-cracking resistance (KC) | 55.3 | 47.5 | 57.1 | 59.1 | 56.4 | 57.3 | 58.8 | 10.1 | 41.9 |
| | $M_{300}$ (kg/cm$^2$) | 140 | 132 | 135 | 139 | 131 | 130 | 130 | 149 | 130 |

We claim:

1. A rubber composition consisting essentially of natural rubber or synthetic rubber, a filler and a dinitrodiamine derivative represented by the formula

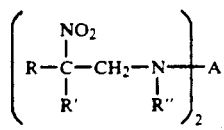

wherein A is an alkylene group having 1-18 carbon atoms, an m- or p-phenylene group,

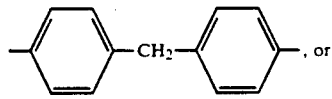, or

;

R and R' are independently hydrogen or an alkyl group having 1-6 carbon atoms; and R'' is hydrogen or an alkyl group having 1-6 carbon atoms.

2. The rubber composition according to claim 1, wherein the dinitrodiamine derivative is represented by the formula

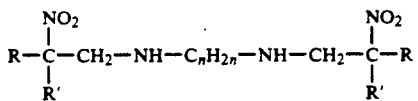

wherein R and R' are as defined in claim 1, and n is an integer of 4-18.

3. The rubber composition according to claim 2, wherein both R and R' are alkyl groups.

4. The rubber composition according to claim 3, wherein the dinitrodiamine derivative is represented by the formula

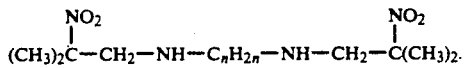

5. The rubber composition according to claim 1, wherein A is an m- or p-phenylene group.

6. The rubber composition according to claim 5, wherein R is methyl, R' is methyl and R'' is hydrogen or methyl.

7. A rubber composition according to claim 1, wherein the content of said dinitrodiamine derivative is in a proportion of 0.1-10 parts by weight to 100 parts of rubber.

8. A rubber composition according to claim 1, wherein said filler is carbon black.

* * * * *